United States Patent [19]

Yurasits

[11] Patent Number: 5,364,151

[45] Date of Patent: Nov. 15, 1994

[54] ADJUSTABLE SEAT APPARATUS FOR UTILITY VEHICLE

[75] Inventor: James J. Yurasits, Allentown, Pa.

[73] Assignee: Mack Trucks, Inc., Allentown, Pa.

[21] Appl. No.: 49,372

[22] Filed: Apr. 21, 1993

[51] Int. Cl.$^5$ .............................................. B60N 2/04
[52] U.S. Cl. ...................................... 296/65.1; 296/69; 297/331; 180/326
[58] Field of Search ................ 296/65.1, 69; 180/326, 180/329; 297/14, 316, 320, 321, 324, 331, 340, 341

[56] References Cited

U.S. PATENT DOCUMENTS

| 483,265 | 9/1892 | Schindler . | |
|---|---|---|---|
| 1,170,343 | 2/1916 | Rowntree | 297/340 X |
| 2,565,666 | 8/1951 | Schaefer . | |
| 2,638,150 | 5/1953 | May . | |
| 2,858,876 | 11/1958 | Woodson, Jr. . | |
| 3,076,517 | 9/1961 | Henry-Biabaud . | |
| 3,279,850 | 10/1966 | Saemann et al. | 297/335 |
| 4,054,319 | 10/1977 | Fogg, Jr. et al. | 297/330 X |
| 4,097,087 | 6/1978 | Garavaglia | 297/284 |
| 4,249,774 | 2/1981 | Andreasson | 297/316 X |
| 4,456,086 | 6/1984 | Wier et al. | 297/DIG. 4 X |
| 4,519,649 | 5/1985 | Tanaka et al. | 297/316 |
| 4,787,675 | 11/1988 | McLeod | 297/335 |
| 5,108,202 | 4/1992 | Smith | 297/316 X |

FOREIGN PATENT DOCUMENTS

| 585455 | 3/1925 | France | 297/340 |
| 2756421 | 6/1979 | Germany . | |
| 134957 | 11/1919 | United Kingdom | 297/340 |
| 608542 | 9/1948 | United Kingdom | 297/316 |
| 1264969 | 2/1972 | United Kingdom . | |

Primary Examiner—Dennis H. Pedder
Attorney, Agent, or Firm—Rothwell, Figg, Ernst & Kurz

[57] ABSTRACT

A seat apparatus for placement in the operating cab of a vehicle which supports a rider of the vehicle in a standing operating position. The seat is secured to the interior of the operating cab and is movable between two positions. In one position, the buttocks support portion and the back support portion of the seat assume a conventional configuration to permit sitting therein. In the other position, the buttocks support portion and the back support portion are both vertically oriented to permit the rider to lean back against the seat while driving the vehicle. A locking mechanism for securing the seat in each position is also provided. The seat is capable of installation in the operating cab of a conventional vehicle.

17 Claims, 6 Drawing Sheets

ADJUSTABLE SEAT APPARATUS FOR UTILITY VEHICLE

BACKGROUND OF THE INVENTION

1. Field of the Invention

The present invention relates to vehicle seats, such as adjustable seats in commercial utility vehicles.

2. Description of the Prior Art

It is known in the prior art to utilize seats in various utility vehicles, e.g., delivery trucks or the like, which can be placed in different positions. For example, U.S. Pat. Nos. 2,565,666 and 3,076,517 disclose delivery trucks with seats that support the driver in a seated driving position and can be moved forward to an "out-of-the-way" position to allow the driver to operate the vehicle in a standing position. In each of the above patents, the seat is moved to an inoperative position, i.e., a position where it does not support the driver, to permit standing operation of the vehicle.

U.S. Pat. No. 3,279,850 discloses an agricultural machine having a movable seat to accommodate sitting or standing operation. The seat includes a horizontal seat portion and a backrest portion. The horizontal portion is swung rearwardly (i.e., toward the rear of the machine) to allow the operator to stand and manipulate the machine. The backrest can be leaned forward so that the operator can either lean against the cushion or sit on the top surface of the backrest cushion. As is the case with the aforementioned patents, the horizontal seat portion is inoperative in this position as it does not support the operator.

The seats disclosed in these patents are thus inoperative, either in whole or in part, when the driver is operating the vehicle in a standing position. Consequently, fatigue arising from such standing operation is more likely to occur due to the lack of support for the driver.

German Patent No. 2,756,421 discloses a fork lift with a driving or operating cabin and a separate frame outside of the cabin which carries a seat. The seat frame is secured to the exterior of the vertical rear wall of the operating cabin and is movable toward and away from this rear wall to allow sitting or standing by the driver. The seat disclosed in this patent does not appear to be suitable for installation in the operating cab of a conventional vehicle since it is carried by a separate frame which is attached to the exterior of the operating cab of the fork lift.

In the fork lift disclosed in this patent, the seat frame is capable of being secured in this manner because there is no structure behind the rear wall of the operating cab of the fork lift. Such is not the case with the aforementioned types of utility vehicles, where there is a containment area for various material., e.g., refuse, typically disposed immediately behind the rear wall of the operating cabin. Thus, there is no space for securing an additional frame carrying the driver seat behind the cabin.

SUMMARY OF THE INVENTION

In accordance with the present invention, a vehicle seat apparatus is provided for supporting a rider of a vehicle in a standing vehicle operating position. The seat apparatus includes a buttocks support member which is selectively positionable to support a rider's buttocks in both a substantially horizontal sitting orientation and a substantially vertical standing orientation within the operating cab of the vehicle. A substantially vertically oriented back support member is also provided for supporting a rider's back in both sitting and standing positions within the interior of the vehicle operating cab.

Additional advantages associated with the present invention will be apparent to one skilled in the art upon reading the following description of a preferred embodiment thereof taken in conjunction with the accompanying drawings.

DESCRIPTION OF THE PREFERRED EMBODIMENTS

Figure 1:
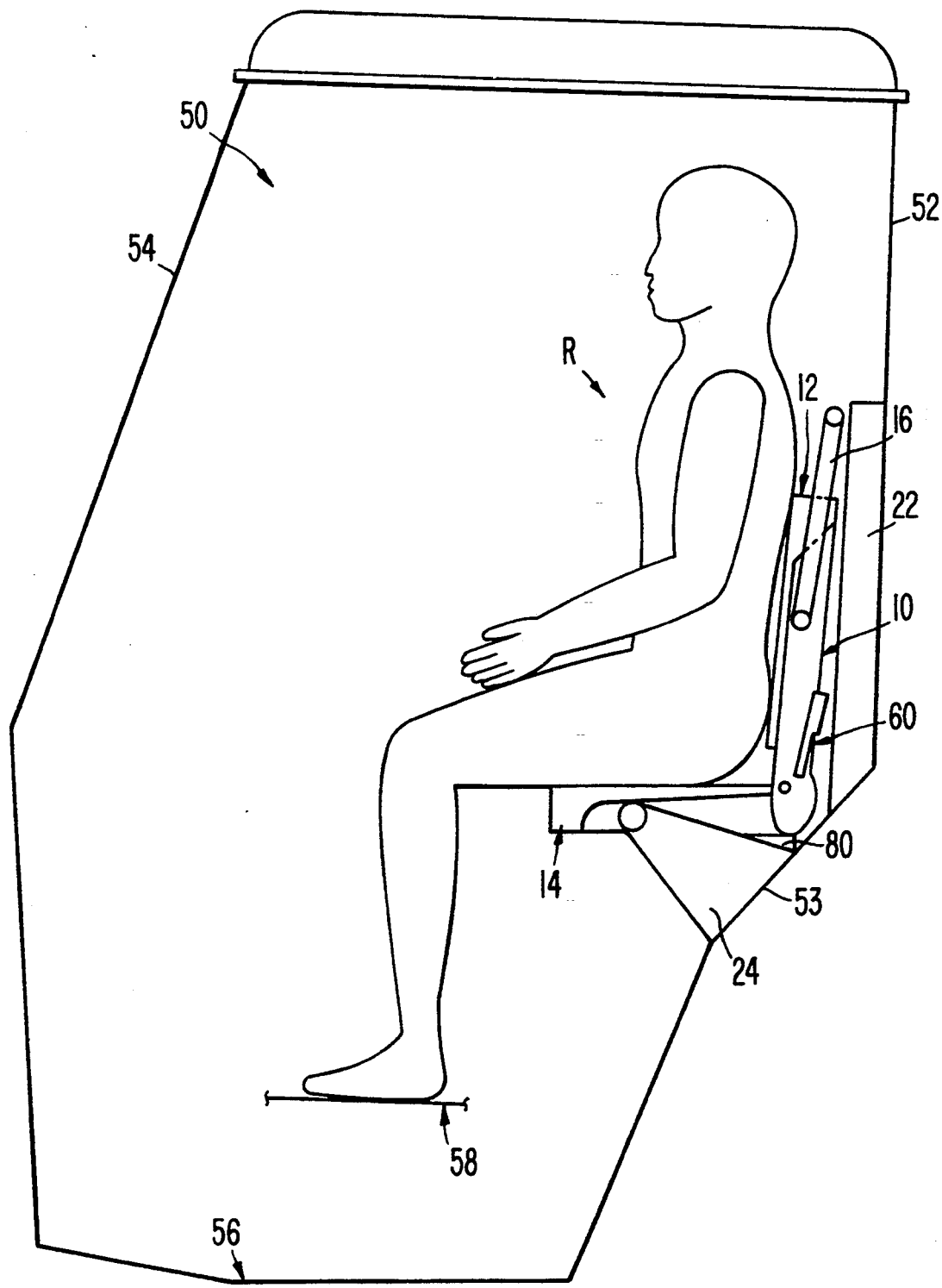
FIG. 1 is a side elevational view, somewhat schematic, of a seat apparatus according to the present invention in a first position with the rider sitting therein.

With reference to FIG. 1, a seat apparatus 10 according to the present invention is shown disposed in the operating cab 50 of a utility vehicle which can be in the form of, e.g., a refuse truck. The operating cab 50 has a rear wall 52, a front windshield portion 54, and a floor 56. A rider R is shown sitting in the seat 10. The term rider is used herein for the sake of convenience and will be understood to encompass both passengers and drivers of the vehicle. The seat 10, which is shown in a first sitting position in FIG. 1, includes a back support member 12 having a generally vertical orientation and a buttocks support member 14 having a generally horizontal orientation to support the rider R in a sitting position with the rider's feet resting on a foot support 58.

Figure 2:
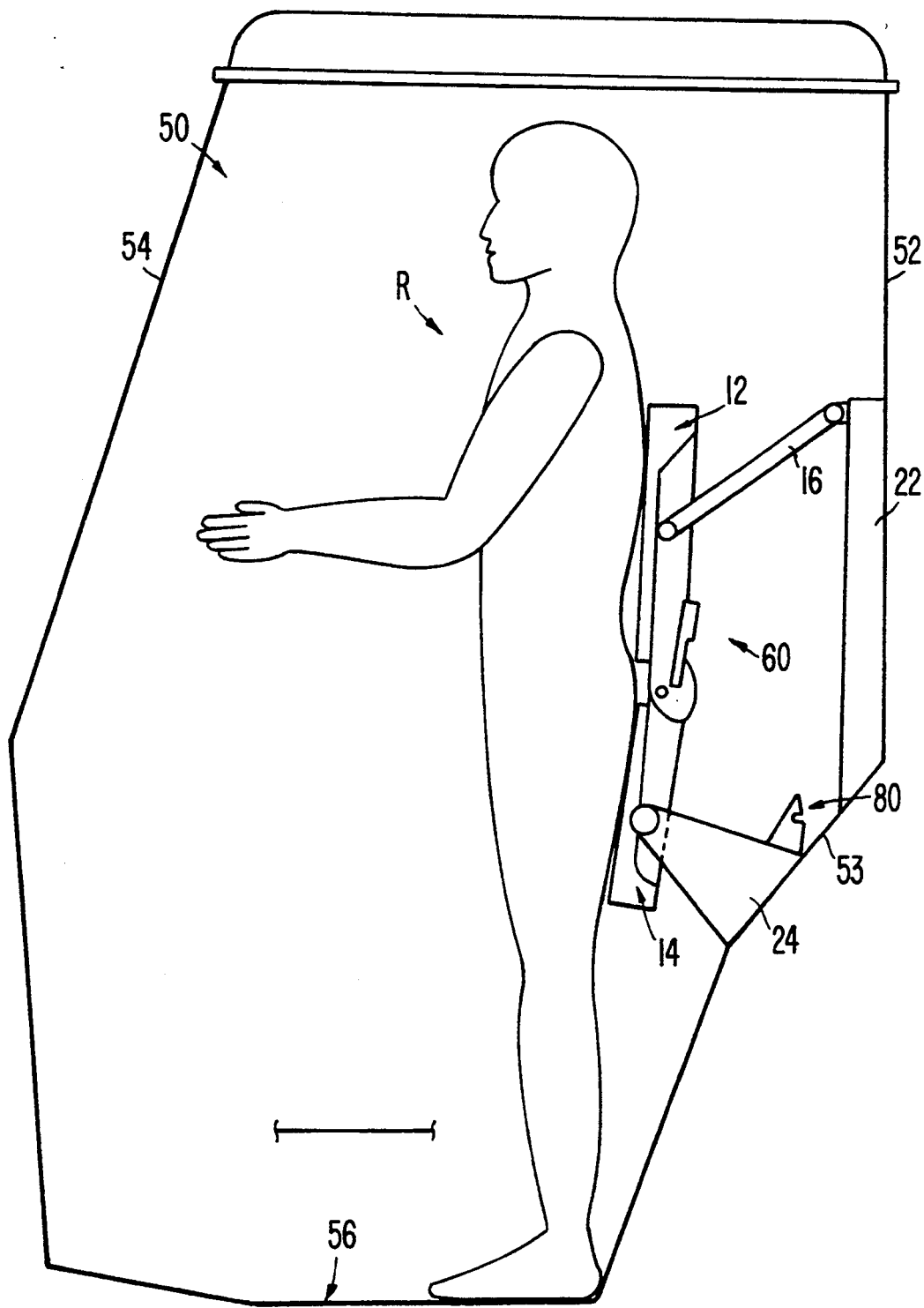
FIG. 2 is a side elevational view, somewhat schematic, of the seat apparatus shown in FIG. 1 in a second position with the rider in a standing, vehicle operating position.

As shown in FIGS. 1 and 2, the back support member 12 is connected to a brace member 22 so as to be pivotable with respect thereto. The brace member 22 is securely attached to the interior of the rear wall 52 of operating cab 50 by any suitable means (not shown), including but not limited to welds or bolts. Back support member 12 is connected to brace member 22 by a movable bar or link member 16, the bar 16 being pivotally connected to both back support member 12 and brace member 22. While member 16 is referred to as a bar member, it will be understood that such reference does not denote a specific shape and that member 16 can be of any suitable form or shape. Buttocks support member 14 is pivotally connected directly to a brace member 24, the brace member 24 being secured to an angled portion 53 of rear wall 52 in the manner discussed above with respect to the connection of brace member 22 to rear wall 52.

The seat apparatus of the present invention is shown in its second standing position in FIG. 2. Locking means 60 is released to move the seat 10 from the first position into its second position, as will be discussed below. In this second standing position, the back support member 12 remains substantially vertical but is displaced from the interior of rear wall 52 of operating cab 50. The buttocks support member 14, which was horizontally disposed in the first position shown in FIG. 1, assumes a substantially vertical orientation. The support members 12 and 14, which are substantially perpendicular in the position shown in FIG. 1, are both substantially vertically oriented in the position shown in FIG. 2. As seen in FIG. 2, the back support member 12 and buttocks support member 14 provide surfaces against which the rider R can lean while operating the vehicle in a standing position. The feet of rider R are placed on the floor 56 of the operating cab 50 in this second position.

Figure 3:
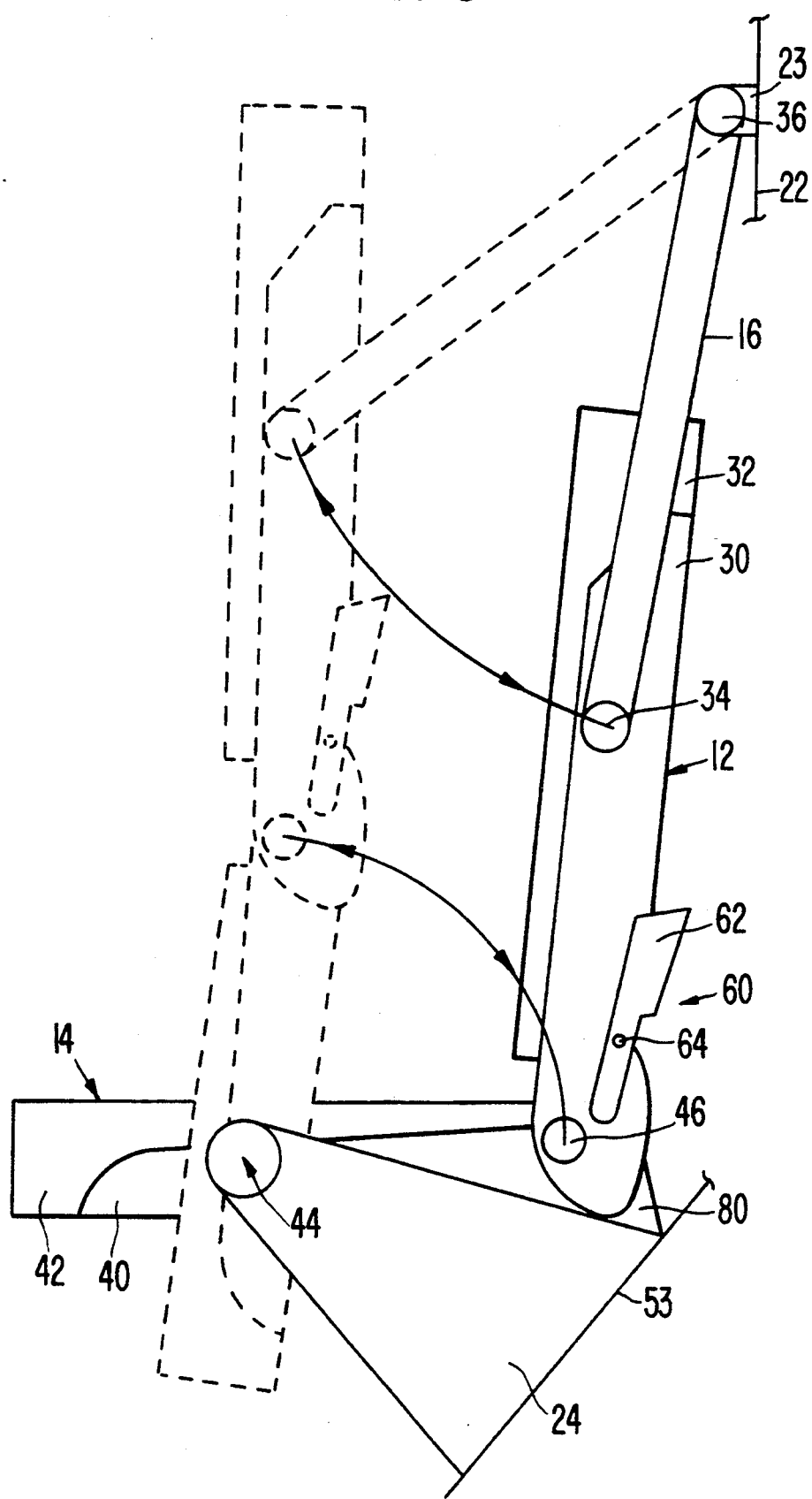
FIG. 3 is a side elevational view, somewhat schematic, showing both positions of the seat apparatus of FIGS. 1 and 2, with the seat standing position shown in phantom lines.
Figure 6:
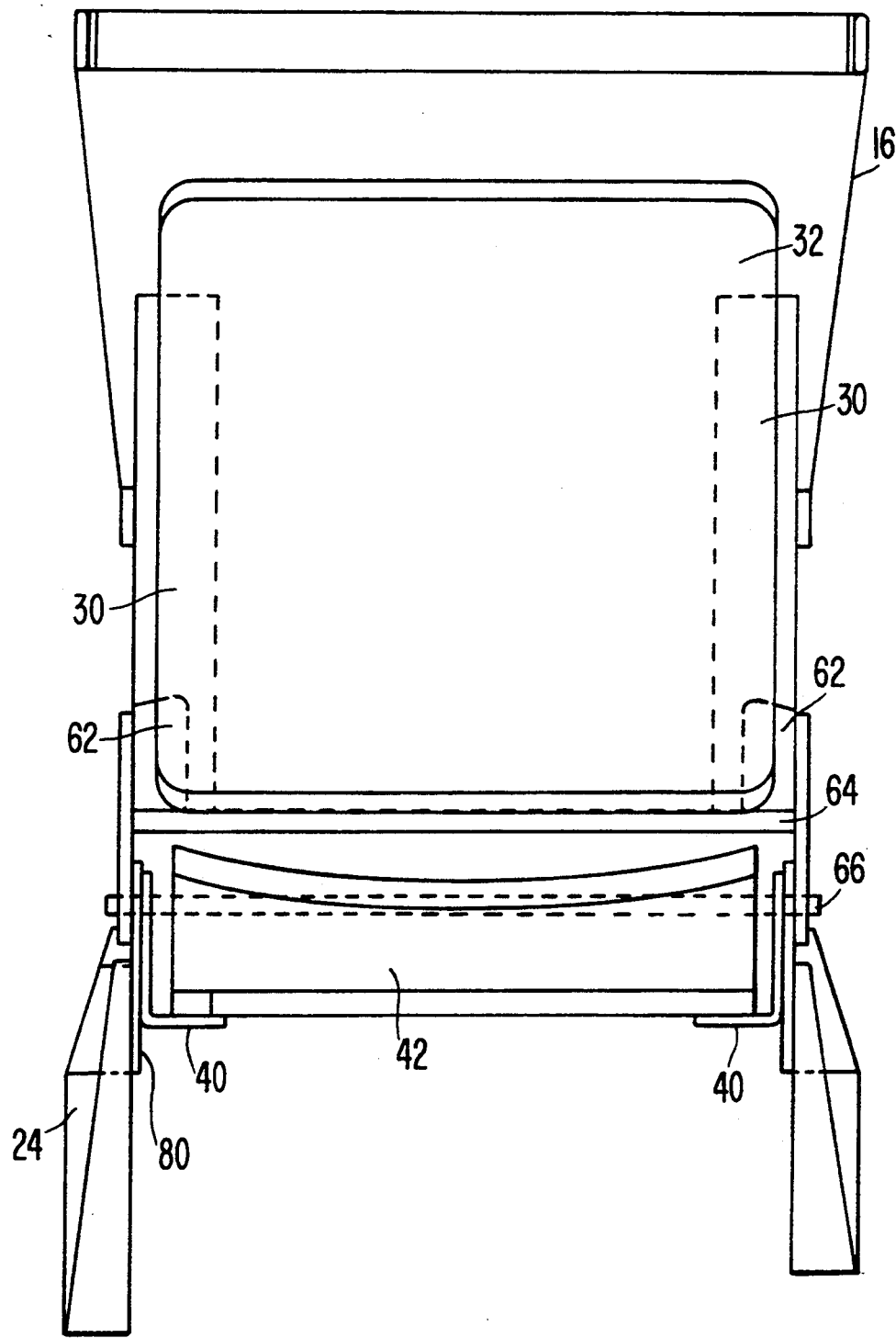
FIG. 6 is a front elevational view of the seat apparatus according to the present invention.

The operation of the seat apparatus of the present invention will be discussed with reference to FIG. 3, where the standing position of the seat apparatus 10 is shown in phantom lines. The back support member 12 includes a pair of frame members 30, as best seen in FIG. 6, and a cushion member 32. A bar member 16 is pivotally connected at one end to each frame member 30 by any suitable means 34 which permits pivoting movement, e.g. a pin or bolt disposed in aligned apertures formed in frame members 30 and bar members 16, to form a movable pivotable connection. The other end of bar member 16 is pivotally connected at 36 to an extension 23 formed on brace member 22 to form a stationary pivotable connection. The brace member 22 is securely attached to the interior of rear wall 52 as described above. The location of brace member 22 on rear wall 52 will be understood as exemplary, and that other locations of the brace member 22 on wall 52 are possible in which the bar member 16 is secured so as to allow the seat apparatus 10 to be moved from one position to the other.

As described above with reference to connecting means 34, means 36 can likewise be any suitable structure which facilitates pivoting movement of back support member 12 relative to bar member 16. As seen in FIG. 6, buttocks support member 14 includes a pair of frame members 40 and a cushion member 42. Each frame member 40 is pivotally connected to a brace member 24 by means 44 to form a stationary pivotable connection. Connecting means 44 can also be any suitable means which provides such pivotal movement, e.g., a pin or bolt as discussed above. As also discussed above, each brace member 24 is attached directly to an angled portion 53 of the interior of rear wall 52. It will be appreciated that the depicted configuration is for the sake of example and that it is possible to secure brace members 24 to the rear wall 52 in a different location so long as buttocks support member 14 is firmly supported in the aforementioned pivotal manner.

The brace members 22 and 24 can be secured in the operating cab of a conventional vehicle by the aforementioned attachment means so that the adjustable seat of the present invention can be installed therein. This enables easy modification of a vehicle having a seat that only supports a rider in a sitting position to a vehicle with a seat capable of supporting the rider in a standing vehicle operating position.

Back support member 12 and buttocks support member 14 are pivotally attached to each other by connecting means 46, which means can be the same as connecting means 34, 36, and 44 described above. For example, means 46 can be in the form of a pin passing through aligned apertures formed in frame members 30 and 40 of support members 12 and 14, respectively. Connecting means 46 facilitates movement of the seat apparatus 10 from its first sitting position to its second standing position with the support members 12 and 14 (as well as connecting means 46) moving in unison as the seat is shifted. As will be discussed below, locking means 60 secures the seat 10 in either of its two positions.

Figure 4:
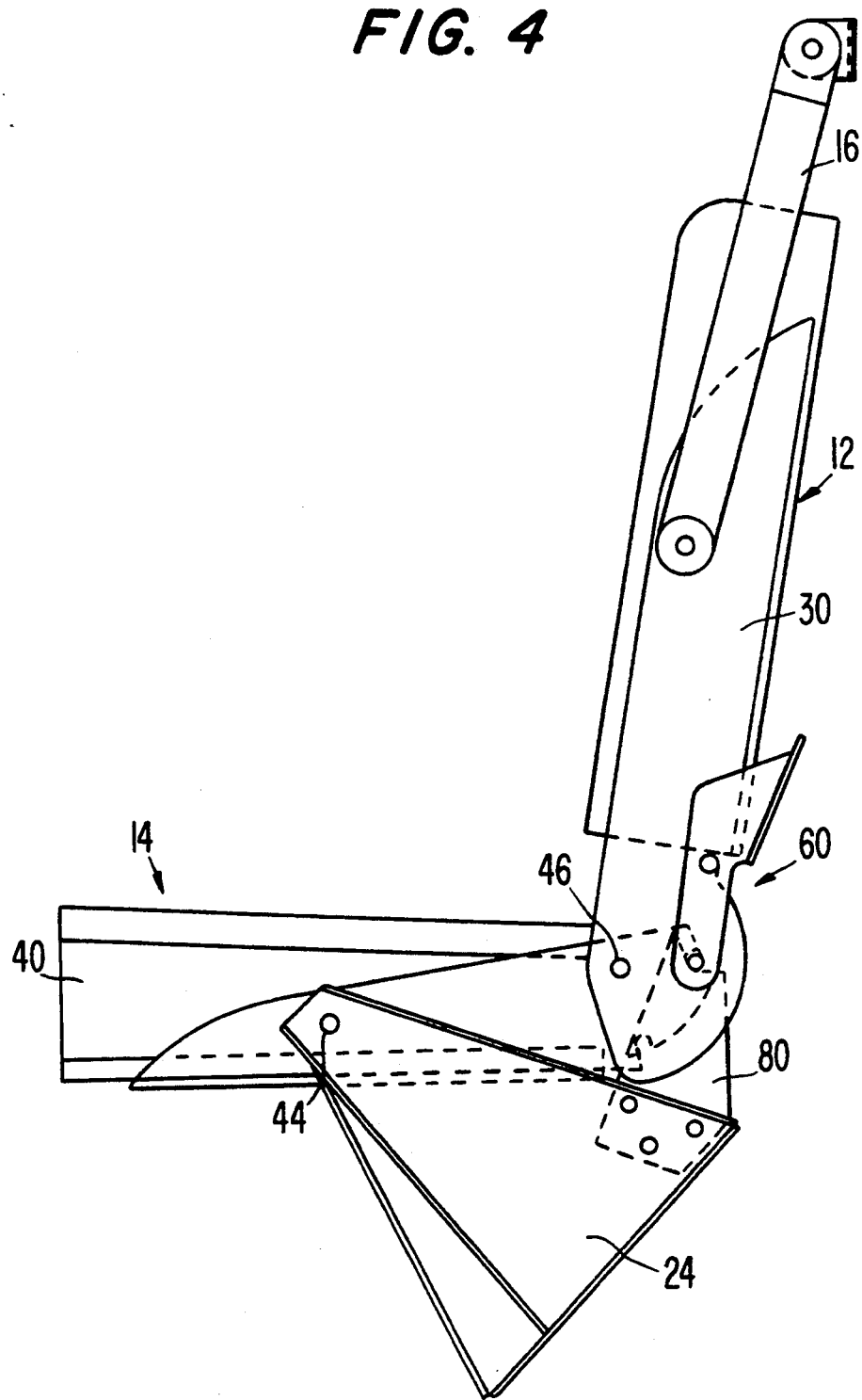
FIG. 4 is a side elevational view showing the seat apparatus and locking means according to the present invention.
Figure 5:
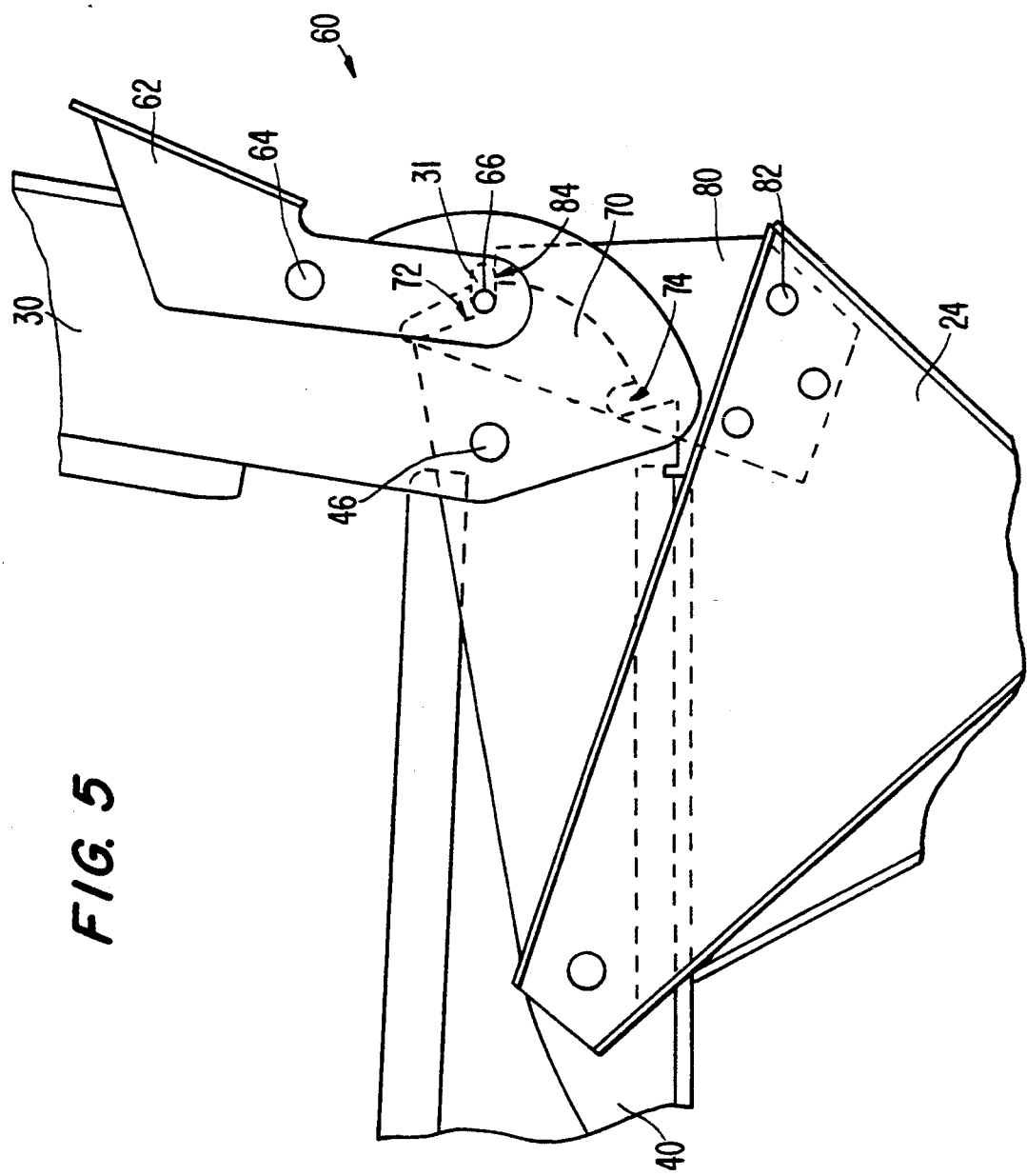
FIG. 5 is an enlarged view of the locking means shown in FIG. 4.

With reference to FIGS. 4–6, locking means 60 will be discussed. A pair of levers 62 are disposed on opposite sides of the seat apparatus 10 and are connected to each other by a pivot bar 64 which extends through clearance holes formed in the two frame members 30 of back support member 12. The pivot bar 64 passes through frame members 30 so as to be rotatable relative to the frame members. Spring biasing means (not shown) are provided on frame members 30 and pivot bar 64 to urge the levers 62 into a locked position as discussed below. The levers 62 have a locking bar 66 secured to their lower end. The locking bar 66 passes through an aperture 31 formed in each frame member 30, which apertures 31 are sized to allow movement of locking bar 66 therein when levers 62 are actuated as described below.

As seen in FIGS. 4 and 5, each frame member 40 of buttocks support member 14 has a slot 72 and a slot 74 formed in its end 70 adjacent locking means 60. Slots 72 and 74 are configured to receive locking bar 66 in the sitting and standing positions, respectively. The locking means 60 further includes a pair of brackets 80 for locking the seat in its sitting position, each bracket 80 being secured to a brace member 24 by any suitable means, for example, bolts 82. As seen in FIG. 6, each bracket 80 is disposed between the frame member 30 of back support member 12 and the frame member 40 of buttocks support member 14. A slot 84 is provided at the top of each bracket 80 for receiving locking bar 66 when the seat is in the sitting position as shown in FIGS. 4 and 5 and discussed below.

The aforementioned spring biasing means urges the upper end of each lever 62 to the right and the lower end of each lever 62, along with locking bar 66, to the left (as viewed in FIGS. 4 and 5). The locking bar 66 is thus forced into slots 84 in brackets 80 and slots 72 of frame members 40 when seat 10 is in the sitting position. The back support member 12 and buttocks support member 14 are securely locked in this sitting position and cannot be moved into the standing position until the levers are placed in a release position as described below. Those skilled in the art will recognize that it is possible to configure the slot 72 similar to slot 74 to receive locking bar 66, thus allowing positive locking without bracket 80. As seen in FIG. 6, a lever 62 is provided on each side of the seat 10 so that the locking means 60 can be operated from either the right-hand or left-hand side. It is only necessary to move one of the levers 62 to unlock the seat 10.

To unlock the seat 10 so that it can be shifted to a standing position, the levers 62 (or only one lever 62) are moved against the spring bias in a counterclockwise direction (as viewed in FIGS. 4 and 5) to a release position in which locking bar 66 is removed from the groove 84 in each bracket 80 and the groove 72 of each frame member 40. The locking bar 66 moves from one end of aperture 31 in each frame member 30 to the other end of aperture 31 when the levers 62 are pivoted. After actuation of levers 62 to remove locking bar 66 from slot 84 in brackets 80, the seat 10 is shifted forward with back support member 12 and buttocks support member 14 pivoting about connecting means 46. As this pivoting takes place, the aforementioned spring biasing means urges locking bar 66 against the arcuate shaped end 70 of each frame member 40 (disposed between slots 72 and 74). When the seat 10 reaches the standing position, the locking bar 66 drops into slot 74 of each frame member 40 due to the spring biasing to lock the back support member 12 and buttocks support member 14 in this position. The end 70 thus serves as indexing means to guide the locking bar 66 into its proper orientation for the respective positions of the seat 10.

To move the seat 10 back to the sitting position, the levers 62 are again pivoted counterclockwise into their release position. This moves locking bar 66 out of slot 74 to allow relative pivoting between back support member 12 and buttocks support member 14, enabling the seat 10 to assume the sitting position. When this position is reached, locking bar 66 is urged by the spring biasing means into slot 84 of each bracket 80 and slot 72 of each frame member 40 to positively lock the seat in the sitting position. The present invention thus provides an adjustable seat apparatus which can be readily installed in conventional utility vehicles to provide a seat capable of supporting a rider in a standing, vehicle operating position.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. A utility vehicle comprising an operating cab and a seat apparatus, the seat apparatus being secured to at least one rear support surface within an interior of the operating cab so as to support a driver of the utility vehicle in either a sitting or standing vehicle operating position, the seat apparatus including:
   a buttocks support member secured to the interior of the operating cab by a first brace member having one end fixed to the interior of the operating cab and an opposite end pivotally connected to the buttocks support member; and
   a substantially vertically-oriented back support member secured to the interior of the operating cab by a second brace member fixed to the interior of the operating cab, and a movable link member having one end pivotally connected to the second brace member such that the link member extends away from the second brace member and an opposite end pivotally connected to the back support member so that the link member supports the back support member in a standing vehicle operating position with the back support member spaced from the second brace member and the at least one rear support surface within the operating cab so as to support the driver at a location disposed away from the rear support surface of the vehicle;
   whereby the driver can operate the utility vehicle with the seat in either a sitting position with the buttocks support member in a substantially horizontally oriented position, or with the seat in a standing position with the buttocks and back support members each in a substantially vertically oriented position.

2. A utility vehicle as in claim 1, wherein said substantially vertically oriented back support member is moved forward from a rearward sitting position to a forward standing position.

3. A utility vehicle as in claim 2, including means pivotally connecting said back and buttocks support members for positioning said seat apparatus in the sitting position in which the back support member is substantially vertically oriented and the buttocks support member is substantially horizontally oriented to permit sitting on said seat apparatus within the vehicle cab, and the standing position in which the back and buttocks support members are substantially vertically oriented to allow the driver to operate the vehicle while being supported in the standing position by both of said support members.

4. A utility vehicle seat apparatus as in claim 1, including means for locking the seat apparatus in either of said positions.

5. A utility vehicle as in claim 4, wherein said locking means is for releasing the seat apparatus to permit the seat apparatus to be moved from one of said positions to the other of said positions.

6. A utility vehicle as in claim 4, wherein said back support member includes a frame, and said locking means includes a lever attached to the back support member frame with a locking bar attached to said lever, and said buttocks support member includes a frame having means for engaging said locking bar to lock the back and buttocks support members together in one of said positions.

7. A utility vehicle as in claim 6, wherein said lever and locking bar are pivotable with respect to said back support member frame, and said buttocks support member frame has two slots for selectively receiving said locking bar to lock said seat apparatus in either of said two positions.

8. A utility vehicle as in claim 1, wherein said support members are pivoted together to move in unison when the seat apparatus is moved from one of said positions to the other of said positions.

9. A utility vehicle as in claim 1, wherein said support members are completely contained within the operating cab of the vehicle in each of said positions.

10. A utility vehicle seat apparatus for supporting the driver of a utility vehicle in either a sitting or standing vehicle operating position, the apparatus comprising:
    a back support member;
    a bar member having one end pivotally connected to said back support member and another end pivotally connected to a first brace member, the bar member extending between the first brace member and the back support member;
    said first brace member having means for being fixed to a support surface within an interior of an operating cab of the utility vehicle such that the connection between the first brace member and the other end of said bar member is a stationary pivotable connection, while the connection between the back support member and the one end of the bar member is a pivotable connection that is movable away from the first brace member in a forward direction such that the entire back support member is disposed away and spaced from said other end of the bar member when in a standing vehicle operating position;
    a buttocks support member pivotally connected to a second brace member;

said second brace member having means for being fixed to the support surface within the interior of the operating cab of the utility vehicle such that the connection between the second brace member and said buttocks support member is a stationary pivotable connection; and said buttocks support member being pivotally connected to said back support member;

whereby said back and buttocks support members are movable from a rearward sitting position to a forward standing position, with the pivotable connection between said back and buttocks support members and the pivotable connection between said back support member and said one end of said bar member being movable with the support members as the seat is moved forward from the sitting position to the standing position.

11. A seat apparatus for placement in an operating cab of a vehicle, the seat apparatus being capable of supporting a driver of the vehicle during standing operation of the vehicle, the seat apparatus comprising:

a substantially vertically oriented back support member having means for securing the back support member to an interior rear wall of said operating cab of the vehicle;

a buttocks support member having means for securing buttocks support member to the interior rear wall of said operating cab at a location below the back support member;

said means for securing the back support member to the interior rear wall including a bar member with one end pivotally connected to the back support member and another end with means for pivotal connection to the interior rear wall, such that upon moving the seat apparatus from a sitting position to a standing position, the entire back support member and said one end of the bar member move away from and are spaced from said other end of the bar member; and means pivotally connecting the back and buttocks support members together so as to permit the seat apparatus to be placed in the sitting position in which the back support member is substantially vertically oriented and the buttocks support member is substantially horizontally oriented to permit sitting in the seat apparatus, and to also permit the seat apparatus to be placed in the standing position in which both support members are substantially vertically oriented, whereby the driver can lean against the support members while operating the vehicle in a standing position.

12. A vehicle seat apparatus as in claim 11, including means for locking the seat apparatus in either of said sitting or standing positions.

13. A vehicle seat apparatus as in claim 11, wherein said locking means is for releasing the seat apparatus to permit the seat apparatus to be moved from one of said positions to the other of said positions.

14. A vehicle seat apparatus as in claim 12, wherein said back support member includes a frame, and said locking means includes a lever attached to the back support member frame with a locking bar attached to said lever, and said buttocks support member includes a frame having means for engaging said locking bar to lock the back and buttocks support members together in one of said positions.

15. A vehicle seat apparatus as in claim 14, wherein said lever and locking bar are pivotable with respect to said back support member frame, and said buttocks support member frame has two slots for selectively receiving said locking bar to lock said seat apparatus in either of said positions.

16. A vehicle seat apparatus as in claim 15, including indexing means for guiding said locking bar into said slots as the seat apparatus is moved from position to position.

17. A vehicle seat apparatus as in claim 11, wherein the means for connection of said back support member includes a brace member configured to be secured to the interior of said operating cab, and the securing means of said buttocks support member includes another brace member configured to be secured to the interior of said operating cab.

* * * * *